United States Patent
De Haan et al.

[11] Patent Number: 5,903,680
[45] Date of Patent: May 11, 1999

[54] IMAGE DATA RECURSIVE NOISE FILTER WITH REDUCED TEMPORAL FILTERING OF HIGHER SPATIAL FREQUENCIES

[75] Inventors: Gerard De Haan; Tatiana G. Kwaaitaal-Spassova; Robert J. Schutten, all of Eindhoven, Netherlands

[73] Assignee: U.S. Philips Corporation, New York, N.Y.

[21] Appl. No.: 08/792,321

[22] Filed: Jan. 31, 1997

[30] Foreign Application Priority Data

Feb. 5, 1996 [EP]  European Pat. Off. .............. 96200250

[51] Int. Cl.[6] ................................ H04N 5/21; G06K 9/40
[52] U.S. Cl. ............................................. 382/265; 348/607
[58] Field of Search ..................................... 382/265, 275, 382/260, 261, 264, 263; 358/463; 348/607

[56] References Cited

U.S. PATENT DOCUMENTS

5,105,274  4/1992  Sakamoto .
5,442,462  8/1995  Guissin .................................... 358/463

FOREIGN PATENT DOCUMENTS

0653882A1  11/1994  European Pat. Off. .

*Primary Examiner*—Scott Rogers
*Attorney, Agent, or Firm*—Lerov Eason

[57] ABSTRACT

An image data recursive noise filter wherein relatively high spatial frequency components of the image data are either not filtered at all or are filtered to a lesser degree than relatively low spatial frequency components of the image data. This minimizes blurring of fine low-contrast detail and also avoids "freezing" of noise in undetailed moving areas of the image.

10 Claims, 6 Drawing Sheets

IMAGE DATA RECURSIVE NOISE FILTER WITH REDUCED TEMPORAL FILTERING OF HIGHER SPATIAL FREQUENCIES

BACKGROUND OF THE INVENTION

1. Field of the Invention

The invention relates to a method and a device for image data noise filtering, and to a display apparatus comprising such a device.

2. Description of the Related Art

In a motion adaptive first-order temporal recursive filter as proposed in References (1) and (2), for every pixel position $\underline{x}=(x, y)^T$, with $^T$ indicating transposition, and an input luminance value $F(\underline{x}, t)$, the filter output $F_F(\underline{x}, t)$ is defined as:

$$F_F(\underline{x}, t) = kF(\underline{x}, t) + (1-k)F_F(\underline{x}, t-T) \tag{1}$$

where k is a control parameter, defining the filter characteristics and T is the field period of the video signal, which equals 20 ms in a 50 Hz environment. In an interlaced scan environment $\underline{x}$ has to be increased ($\underline{x}+(0, 1)^T$) or decreased ($\underline{x}-(0, 1)^T$) with one line, as the corresponding pixel in the previous field does not exist. In an advantageous implementation (Reference (3)), the vertical position is field alternatively increased or decreased:

$$F_F(\underline{x}, t) = kF(\underline{x}, t) + (1-k)F_F\left(\underline{x} + \begin{pmatrix} 0 \\ (-1)^{N_F} \end{pmatrix}, t - T\right) \tag{2}$$

where $N_F$ is the field number. The variable k is determined with a so-called motion detector, the processing of which can be expressed as:

$$k(\underline{x}, t) = LUT\left(\sum_{\underline{n}_2 \in N_2}\left[abs\left(\sum_{\underline{n}_1 \in N_1} [F(\underline{x} + \underline{n}_1 + \underline{n}_2, t) - F_F(\underline{x} + \underline{n}_1 + \underline{n}_2, t - T)]\right)\right]\right) \tag{3}$$

where $N^1$ and $N_2$ are (usually small) neighborhoods around the current pixel, and LUT is a monotonous, non-linear Look-Up Table function that translates its argument into a value usually between 1/32 and 1.

Although the filter is adapted to perform less filtering in case of motion, see equation (3), usually some blurring of fine low-contrast detail is still visible. If the motion detector of equation (3) is set more sensitive in order to prevent this blurring, the noise reduction capability decreases dramatically as the noise itself is seen as motion.

Another disadvantage of the classical temporal filter described, is that it causes a "dirty window effect", i.e., the filter suppresses the higher temporal frequencies which "freezes" the noise on the screen. In undetailed moving areas, therefore, the noise appears as a dirt on the screen behind which the undetailed body moves.

SUMMARY OF THE INVENTION

It is, inter alia, an object of the invention to provide improved image data noise filtering techniques. To this end, a first aspect of the invention provides a method of image data noise filtering in dependence upon a local image spectrum, wherein the filtering is stronger for low frequencies than for higher frequencies. A second aspect of the invention provides a device for image data noise filtering in dependence upon a local image spectrum, wherein the filtering is stronger for low frequencies than for higher frequencies. A third aspect of the invention provides a display apparatus comprising a display device (D) and a image data noise filtering device, as noted above, in a video signal processing path connected to said display device (D).

A primary aspect of the invention provides a method of image data noise filtering in dependence upon a local image spectrum, wherein the filtering is stronger for low frequencies than for higher frequencies.

These and other aspects of the invention will be apparent from and elucidated with reference to the embodiments described hereinafter.

DESCRIPTION OF THE PREFERRED EMBODIMENTS

The invention is based on the recognition that both problems, the blindness of the motion detector for low-contrast high frequencies and the dirty window effect, are related to the filtering of low-contrast high spatial frequencies. The invention is further based on the recognition that high frequency noise is much less annoying than low-frequency noise. This suggests the attractiveness of a filter design that suppresses high spatial frequencies less than low spatial frequencies.

There is yet another reason to look for options in which the high spatial frequencies are filtered less. Let us consider a sinusoidal pattern in the horizontal spatial domain which is moving in horizontal direction. This can be described as:

$$F(\underline{x}, t+T) = F(\underline{x} + \underline{D}(\underline{x}, t), t) \tag{4}$$

where $\underline{D}(\underline{x}, t)$ is a displacement or motion vector, and $$F(\underline{x}, t) = \sin(\omega x) \tag{5}$$

or combining equations (4) and (5):

$$F(\underline{x}, t+T) = \sin((x + D(\underline{x}, t))\omega) \tag{6}$$

Using:

$$\sin\alpha - \sin\beta = 2\cos\left(\frac{\alpha+\beta}{2}\right)\cdot\sin\left(\frac{\alpha-\beta}{2}\right) \quad (7)$$

we find that in first order approximation and small displacements (velocities), the amplitude of the resulting field difference FD, i.e., the difference between equations (4) and (6), due to motion amounts to:

$$\|FD\| = 2\sin\left(\left(\frac{\underline{D}(x,t)\omega}{2}\right)\right) \approx \underline{D}(x,t)\omega \quad (8)$$

This implies that, for a given velocity of a sinusoidal pattern, the blurring of the first order recursive noise filter will linearly increase with the frequency.

It makes sense, therefore, to reduce the effect of the temporal recursive filtering with increasing spatial frequency. For a given acceptable degree of filtering in the high frequencies, this means a stronger filtering in the lower spatial frequencies, and therefore a higher gain in (weighted) signal to noise ratio. Or, reversely, for a sufficient increase in signal to noise ratio with the noise filter, less blurring of low-contrast detail will occur, while further, the noise freezing disappears.

Figure 1:
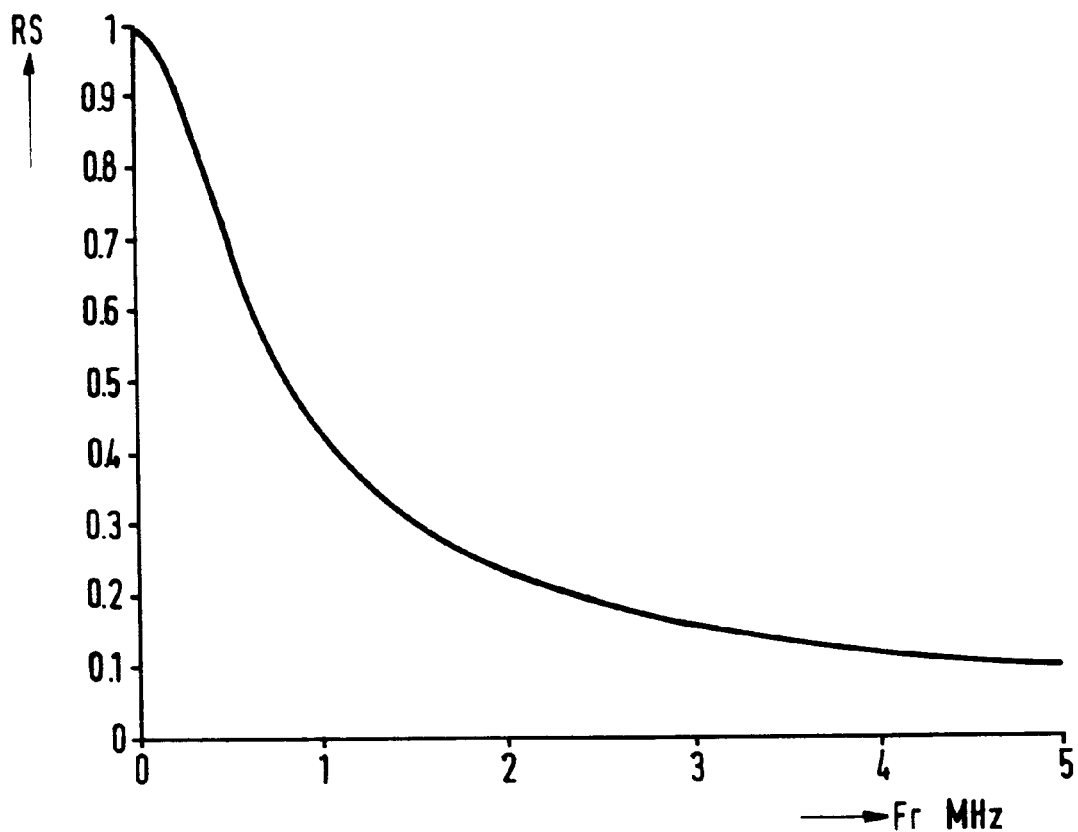
FIG. 1 shows the noise weighting curve as proposed by the CCIR recommendation 421-1.
Figure 2:
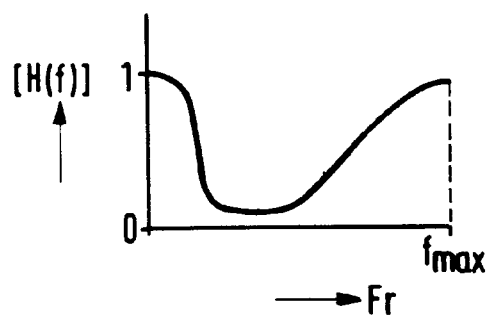
FIG. 2 illustrates a desired filtering for an implicit high frequency bypass.

The lesser filtering in the high frequencies does not cause a dramatic fall in S/N gain as this gain (weighted) is mainly determined by the low-frequency noise reduction, as can be seen from FIG. 1 which shows the PAL/SECAM noise weighting curve as proposed by the CCIR recommendation 421-1 (Reference (4)). The horizontal axis shows the frequency Fr in MHz, and the vertical axis shows the relative sensitivity RS. FIG. 2 illustrates a desired noise reduction filtering involving an implicit high frequency bypass. The horizontal axis shows the frequency Fr, and the vertical axis shows the filter transfer function |H(f)|. Alternatively, it is possible to provide an explicit bypassing of the high-frequency signal components around the noise filter.

In such explicit high-frequency bypassing noise filters, the motion detector from the prior art temporal recursive filter can be replaced by a 2-D spatial high-pass filter. Consequently, the high-frequency signal components pass the recursive filter without attenuation, while the lower spatial frequencies are temporally filtered. In the z-domain, we can describe this as:

$$F_F(z_x, z_y, z_t) = H_{HP}(z_x, z_y)F(z_x, z_y, z_t) + (1-H_{HP}(z_x, z_y))\cdot z_t^{-1}\cdot F_F(z_x, z_y, z_t) \quad (9)$$

Figure 3:
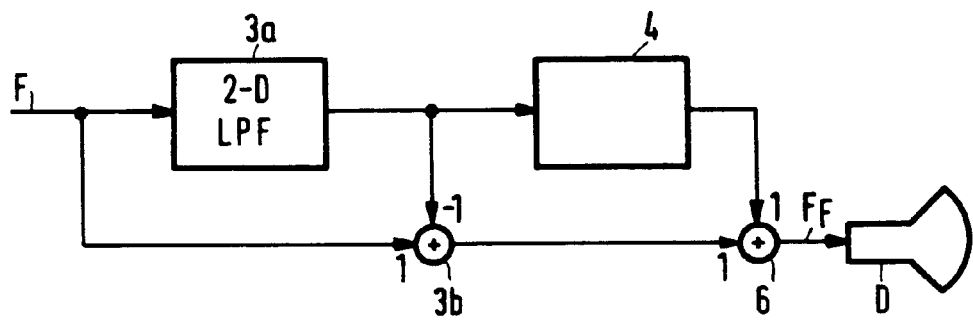
FIG. 3 shows an embodiment of a noise filter in accordance with the invention with explicit high frequency bypass.

FIG. 3 shows a simple embodiment of a noise filter in accordance with the invention with explicit high frequency bypass. The noise filter is part of a video signal processing path connected to a display device D; the other elements of the video signal processing path are not shown. An input signal F is applied to a 2-D low-pass filter 3a. An output signal of the LPF 3a is subtracted from the input signal F by a subtracter 3b to obtain the bypassed high frequency signal components. The low-frequency signal components from the LPF 3a are applied to a noise reduction filter 4, the output of which is added to the bypassed high frequency signal components by an adder 6 to obtain the output signal $F_F$ which is applied to the display device D. Preferably, the two-dimensional low-pass filter 3a has a bandwidth that is larger than that of the noise weighting function. The bypassed filter circuit shown in FIG. 3 appeared to yield a better performance than the noise reduction filter 4 alone. The following reasons can be given for this improved performance:

The input of the noise filter 4 lacks the high frequencies. Consequently, in an implementation of the noise filter 4 in which samples used in the actual filtering operation are selected from a plurality of potentially available samples, a selection of samples used in the noise reduction filtering will be more consistent throughout the image, which will give a smoother picture. Also, in a recursive implementation of the noise filter 4, the chance that a recursion is interrupted by vertical transients in the image is decreased.

In the output of the total filter arrangement, more high frequencies remain present; they are not affected by the noise reduction filtering. Moreover, the remaining high frequency noise masks any artifacts that a filter would have in the higher frequencies (e.g., phase shifts), and adds a subjective sharpness to the image. The presence of high frequency noise shows a more consistent and appreciated picture to the human visual system.

The difference between a signal at the input of the high-pass filter and at its output can be used to control the filter. When this difference is outside an interval which is controlled by the standard deviation of the noise $\sigma_n$, the filter is switched off. In this case the transfer function of the filter becomes:

$$F_F(z_x, z_y, z_t) = H_m(z_x, z_y)F(z_x, z_y, z_t) + (1-H_m(z_x, z_y))\cdot z_t^{-1}\cdot F_F(z_x, z_y, z_t) \quad (10)$$

where Hm is the modified transfer function of the high-pass filter (HPF), defined as $$H_m(z_x, z_y) = \begin{cases} H_{HP}(z_x, z_y), & |a-b| < \alpha\cdot\sigma_n \\ 1, \text{(else)} \end{cases} \quad (11)$$

where alpha is an experimentally optimized constant, and a and b are the input signal and the output signal of the high-pass filter, respectively. This implementation is shown in FIG. 4.

Figure 4:
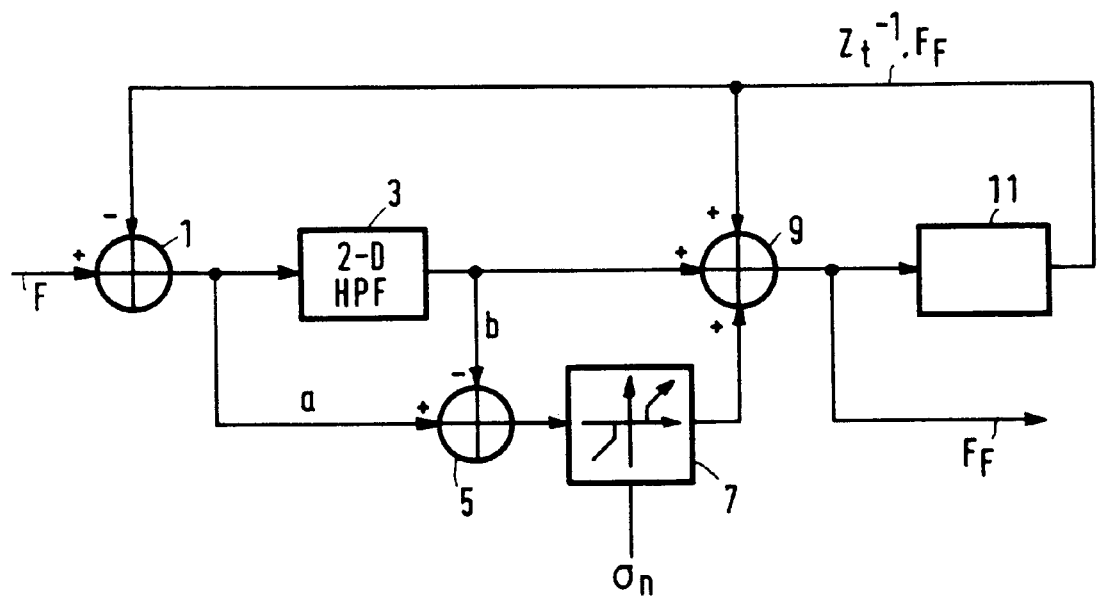
FIG. 4 shows a first more elaborate embodiment of a noise filter in accordance with the invention.

In FIG. 4, an input signal F is applied to a non-inverting input of a subtracter 1, the inverting input of which receives a delayed filtered signal $z_t^{-1}\cdot F_F$. FF. The output signal a of the subtracter 1 is applied to a 2-D high-pass filter 3, the output signal b of which is subtracted from the input signal a of the high-pass filter 3 by a subtracter 5. The output signal (a-b) of the subtracter 5 is applied to a coring circuit 7 which is controlled by the standard deviation of the noise $\sigma_n$. The output-signal of the coring circuit 7 is added to the output signal b of the high-pass filter 3 and to the delayed filtered signal $z_t^{-1}\cdot F_F$ by an adder 9, which provides the filtered output signal $F_F$. This filtered output signal $F_F$ is applied to a field delay circuit 11 to obtain the delayed filtered signal $z_t^{-1}\cdot F_F$.

Figure 5:
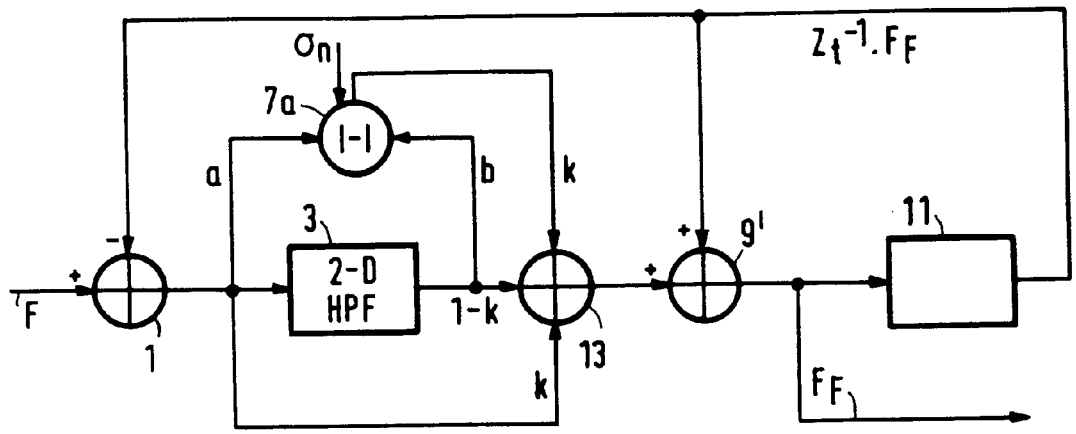
FIG. 5 shows a second more elaborate embodiment of a noise filter in accordance with the invention.

Another, more sophisticated, implementation is given in FIG. 5. Rather than rendering the high-pass filter 3 ineffective by means of the elements 5 and 7, its filtering can be decreased by applying a mixer 13 controlled by a coefficient k, calculated on the base of the absolute difference |a-b| between the signal a at the input of the high-pass filter 3 and the signal b at its output as follows:

$$H_m(z_x, z_y) = (1-k)\cdot H_{HP}(z_x, z_y) + k \quad (12)$$

with:

$$k = \min\left(\frac{|a-b|}{2\sigma_n}, 1\right) \quad (13)$$

The circuit 7a calculates the mixer coefficients k and 1-k in dependence upon the signals a and b and the standard deviation of the noise $\sigma_n$. The adder 9' sums the output signal of the mixer 13 and the delayed filtered signal $z_t^{-1} \cdot F_F$ to obtain the filtered output signal $F_F$. Thus, the 2-D high-pass filter 3 is used to obtain less filtering in the higher spatial frequencies, and the mixer 13 is used to decrease the filtering.

Figure 6:
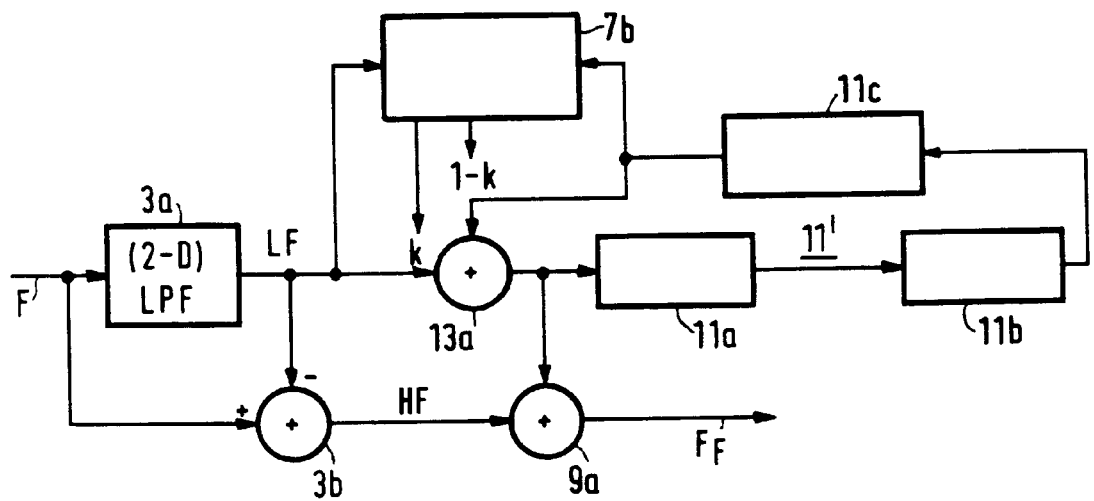
FIG. 6 shows yet another implementation of a noise reduction filter in accordance with the invention.

FIG. 6 shows yet another implementation of the noise reduction filter in accordance with the invention. The input signal F is applied to a (2-D) low-pass filter 3a to obtain a low-frequency signal LF. A subtracter 3b subtracts the signal LF from the input signal F to obtain a high-frequency signal HF. The signal LF is applied to a mixer 13a, the output signal of which is added to the signal HF by an adder 9a to obtain the filtered output signal $F_F$. The output signal of the mixer 13a is also applied to a field delay arrangement 11', comprising a block-summator 11a which calculates the average value of a block of pixels values, a block field delay 11b, which only needs to store one average value per block instead of all pixel values of each block, and a bi-linear interpolator 11c, to obtain delayed pixel values for all pixel positions. The low-frequency signal LF and the output signal of the field delay arrangement 11' are applied to a motion detector 7b to obtain mixer coefficients k and 1–k for the mixer 13a. In this embodiment, the high-frequency signals HF are not subjected to the noise filtering operation carried out by the field delay arrangement 11' and the mixer 13a.

As set out above, the performance of a temporal recursive noise filter can be improved when the spatial high frequencies are not filtered. The high frequencies need not to be filtered, because they are less perceptible. No filtering of the high frequencies also means an improvement of the filter's behavior in the case of movement in the image. In a conventional recursive noise reducing filter in which an attenuated difference between a new signal and a delayed signal is added to the delayed signal, the (implicit) high bypass can be introduced by replacing the attenuation of the difference with a two-dimensional spatial high-pass filter. This filter can be seen as a control filter that adapts the amount of recursion in dependence upon the spatial frequency content.

The same idea of recursive filtering can be extended into the spatial domain. The field delay is replaced by a delay in a spatial direction (e.g., horizontal, vertical, or a diagonal direction). The attenuation of the difference between new and delayed information can be adapted to the image content as follows:

Adaptation to high frequencies: a high-pass control filter (orthogonal to the filtering direction) is used instead of a fixed attenuation factor. In this way, the attenuation factor is increased at high frequencies to provide for an implicit bypass of the high frequencies.

Adaptation to transients: a noise filter which is selective to the image content should decrease its filtering at steep transients in the image. The absolute difference between input and output of the high-pass filter can be used as a detector of transients in the filtering direction. The adaptation of transients is achieved by using the absolute difference to fade the input of the second summation node between the input and the output of the high-pass filter, see fader 79 in FIGS. 7–10.

Adaptation to noise level: the effect of the fader is controlled by the current noise level in the image. In this way, a degradation of almost noise-free images is prevented. For example, a higher noise level increases the thresholds Th1 and Th2 in the non-linear fading function in fader circuit 77 of FIG. 7.

Figure 7:
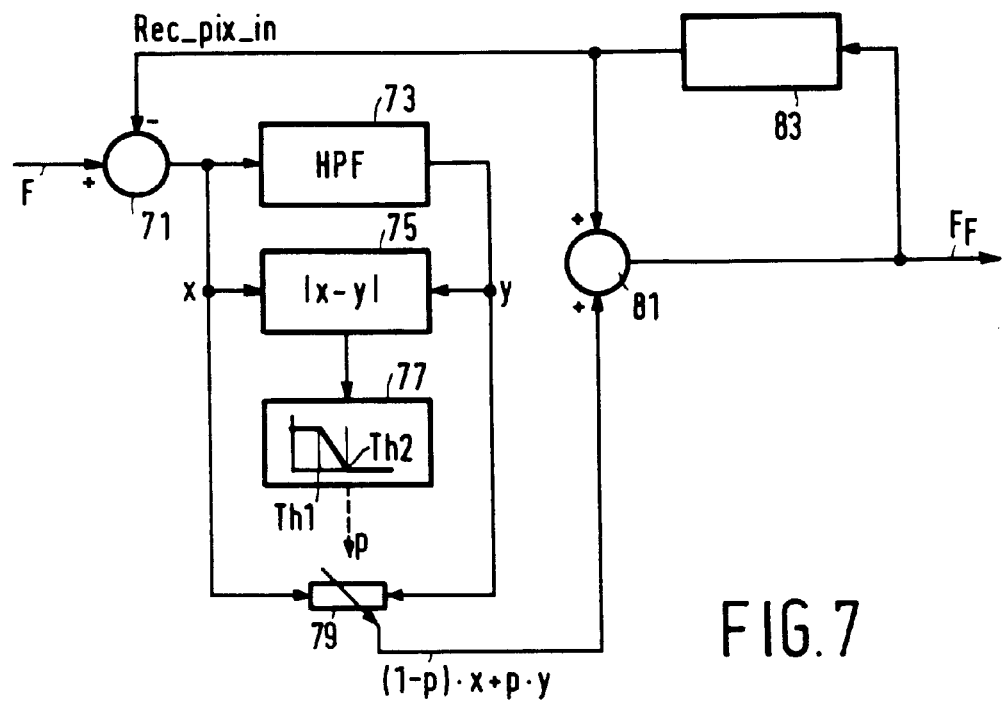
FIG. 7 shows an embodiment of a vertical recursive noise filter in accordance with the invention.

FIG. 7 shows an embodiment of a vertical recursive noise filter in accordance with the invention. The delay element 83 is a line delay, and the high-pass filter 73 is a non-recursive horizontal high-pass control filter with filter coefficients –¼, ½, and –¼. The filter is thus a recursive filter of which the filtering decreases with increasing spatial frequency in a direction (horizontal) which does not coincide with the direction of the recursion loop (vertical). Alternatively, a pixel delay is used as the delay element 83 in the recursion loop, and the high-pass filter 73 is a vertical filter having line delays. However, to obtain good filtering results, the high-pass filter 73 should contain at least two delay elements, so that this alternative is more expensive (as it needs 2 line delays) than the embodiment in which the recursion loop contains a single line delay 83 and the high-pass filter 73 contains two pixel delays.

In FIG. 7, the input signal F is applied to a non-inverting input of a subtracter 71, the inverting input of which receives a recursive pixel input Rec-pix-in from a line delay 83 to which the filtered output signal $F_F$ is applied. The output signal x of the subtracter 71 is applied to a horizontal high-pass filter 73. The output signal y and the input signal x of the high-pass filter 73 are applied to an absolute difference calculating circuit 75, the output of which is applied to a non-linear fading circuit 77 to obtain a fading control signal p. The output signal y and the input signal x of the high-pass filter 73 are also applied to a fading circuit 79 in which they are combined in dependence upon the fading control signal p. The output signal of the fading circuit 79 is added to the recursive pixel input Rec-pix-in from the line delay 83 to obtain the filtered output signal $F_F$.

Figure 8:
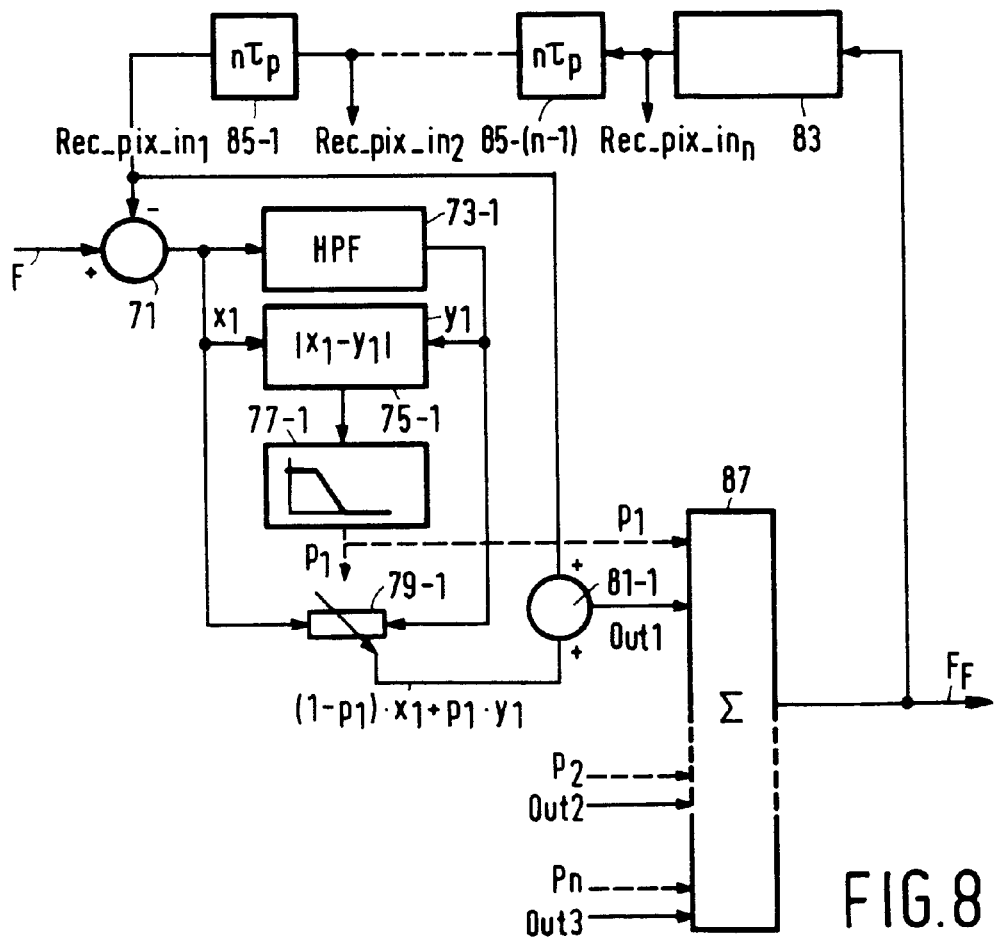
FIG. 8 shows an embodiment of an extended recursive noise filter in accordance with the invention.

FIG. 8 shows an embodiment of an extended recursive noise filter in accordance with the invention. This filter can be seen as a few recursive noise filters connected in parallel. In this way, a filter that filters in more directions than the recursive noise filter of FIG. 7 is constructed with just a little extra cost, since the additional pixels do not require an extra line delay but only extra horizontal delays and extra horizontal control filters. The combination of the outputs of the parallel recursive noise filters is achieved by a weighted summation of the parallel branches. Through this form of summation, the branch that currently has the strongest recursive filtering, will have the strongest weight at the output of the overall filter. This allows the filter to change the direction of the filtering without a very large change of the recursive strength of the filter. In more detail, a plurality of pixel delays 85-1 . . . 85-(n–1), each delaying by n pixel periods $\tau_p$, is connected to the output of the line delay 83. At the output of each pixel delay 83-i, a recursive pixel input Rec-pix-i can be obtained, while recursive pixel input Rec-pix-n is obtained from the output of the line delay 83. In FIG. 8, only the first parallel branch is elaborated. That branch corresponds to the elements 71 . . . 81 of FIG. 7; the reference number of each element being augmented by the suffix "–1". The output $Out_1$ of the adder 81-1 is not applied to the line delay 83, but is applied to a weighted averager 87 which also receives the fading control signal $p_1$ from the non-linear fading circuit 77-1 as a weighting coefficient. In a similar manner, the outputs $Out_i$ from the other branches 73-i . . . 81-i are applied to the weighted averager 87 together with their respective fading control signals $p_i$. The fading control signals $p_i$ indicate the filtering strengths of the respective parallel branches. The weighted averager 87 supplies the output signal $F_F$ to the circuit output and to the line delay 83.

Figure 9:
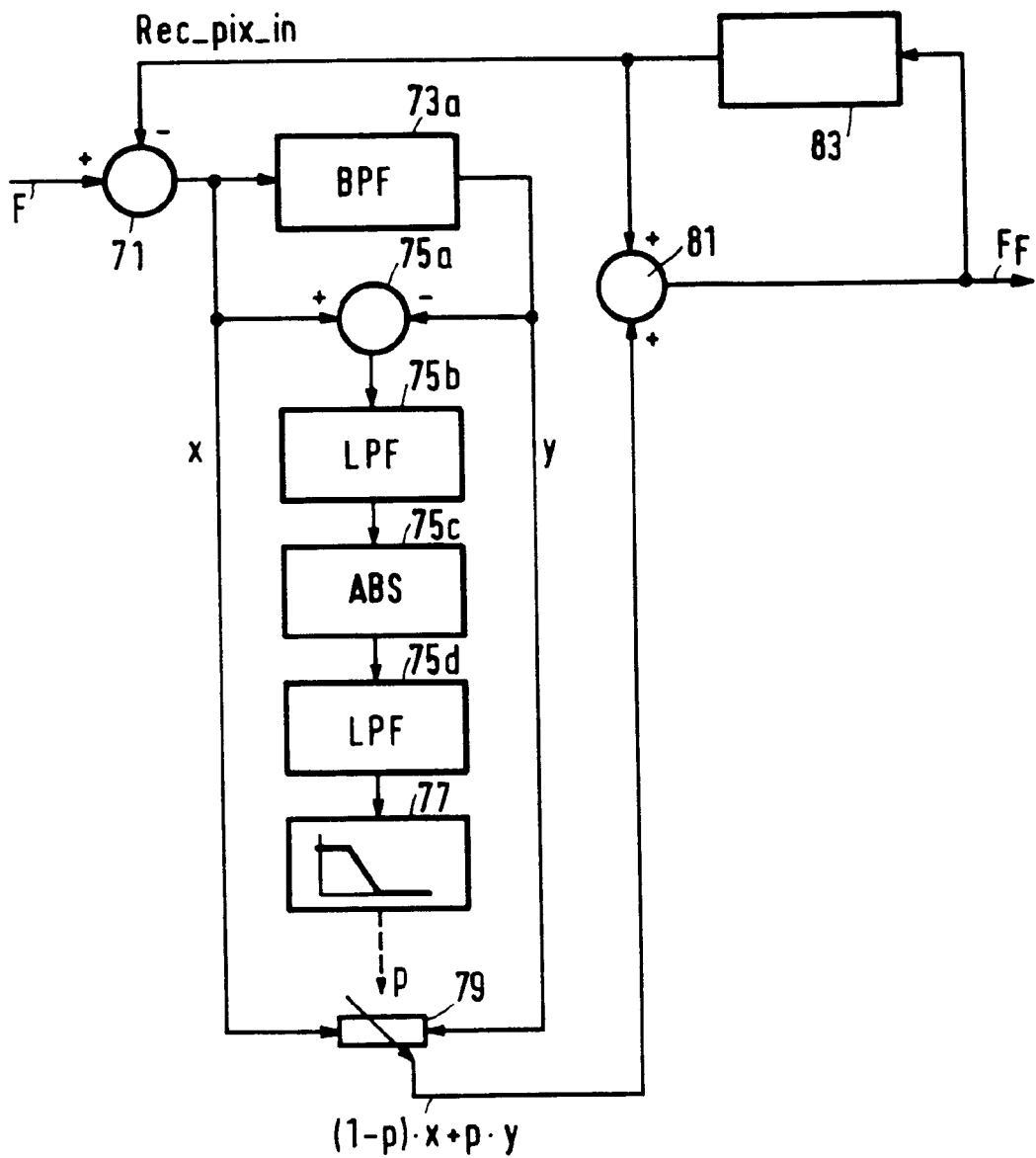
FIG. 9 shows another embodiment of a vertical recursive noise filter in accordance with the invention.

FIG. 9 shows another embodiment of a vertical recursive noise filter in accordance with the invention. This embodiment corresponds to that of FIG. 7, but the high-pass filter 73 of FIG. 7 is replaced by a band-pass filter 73a, and the absolute difference calculating circuit 75 of FIG. 7 is replaced by the cascade connection of a subtracter 75a, a first low-pass filter 75b, an absolute value circuit 75c, and a second low-pass filter 75d. For example, a band-pass filter with tap coefficients −1, 0, 2, 0, −1 can be used at a sample frequency of 16 MHz.

Figure 10:
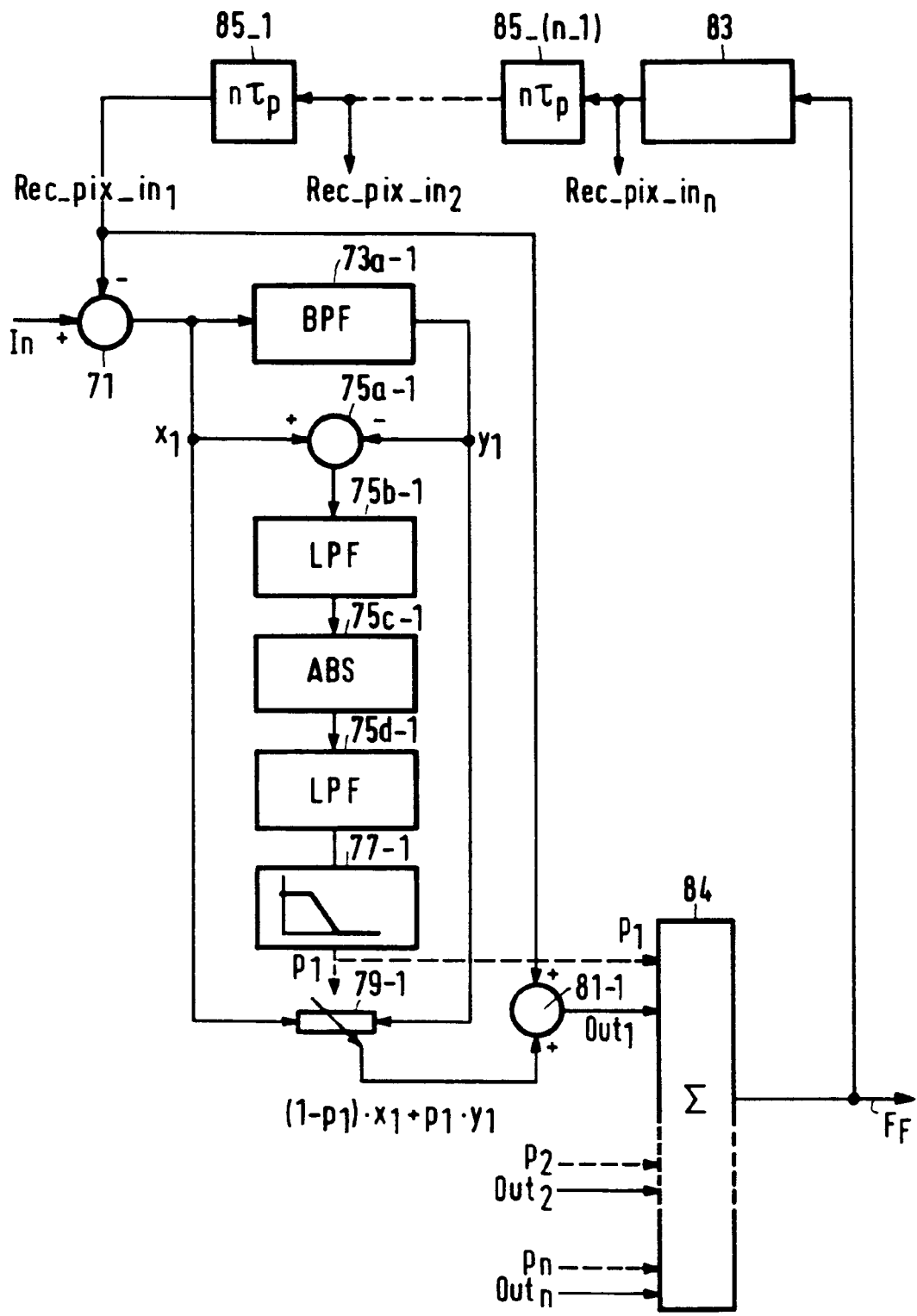
FIG. 10 shows another embodiment of an extended recursive noise filter in accordance with the invention.

FIG. 10 shows another embodiment of an extended recursive noise filter in accordance with the invention. This embodiment corresponds to that of FIG. 8, but the high-pass filters 73-i of FIG. 8 are replaced by band-pass filters 73a-i, and the absolute difference calculating circuits 75-i of FIG. 7 are replaced by respective cascade connections of a subtracter 75a-i, a first low-pass filter 75b-i, an absolute value circuit 75c-i, and a second low-pass filter 75d-i.

Obviously, it is possible to include motion compensation in the feedback loop of the temporal recursive filter. Although, as discussed above, the filter is less critical for motion blurring, motion compensation proves experimentally to be still a useful sophistication.

A primary aspect of the invention can be summarized as follows. Motion adaptive first order recursive temporal filters are popular in television noise filtering, but introduce comet tails in moving scenes and cause freezing of the noise as the most annoying defects. The current invention proposes a modification to this classical filter that largely eliminates its disadvantages, simplifies the motion detector design, and reduces the need for motion compensation. A primary embodiment of the invention provides a temporal recursive (first order) noise filter for image data, in which the temporal filtering depends on the local spatial image spectrum, such that the temporal filtering is strongest for low spatial frequencies and weaker for higher spatial frequencies. Preferably, the filtering is reduced for all spectral content if the effect of the filter is large, compared to the noise amplitude. Advantageously, motion compensation is included in the feedback loop.

It should be noted that the above-mentioned embodiments illustrate rather than limit the invention, and that those skilled in the art will be able to design many alternative embodiments without departing from the scope of the appended claims. While recursive embodiments are shown, non-recursive (i.e., transversal) implementations are also possible. The invention can be implemented by means of hardware comprising several distinct elements, and by means of a suitably programmed computer.

References:
[1] R. N. Jackson and M. J. J. C. Annegarn, "Compatible Systems for High-Quality Television", *SMPTE Journal*, July 1983.
[2] T. Grafe and G. Scheffler, "Interfield Noise and Cross Color Reduction IC for Flicker Free TV Receivers", *IEEE transactions on Consumer Electronics*, Vol. 34, No. 3, August 1988, pp. 402–408.
[3] J. G. Raven, "Noise suppression circuit for a video signal" UK Patent Application no. GB 2083317 A, August 1981, (PHN 9822).
[4] "CCIR recommendation 421-1, annex III", *Documents de la XIe assemblée plénière*, Oslo, 1966, Volume V, Genève, 1967, pp. 81–82.

We claim:

1. A method of recursive image data noise filtering based on a local spatial spectrum of the image, relatively low spatial frequency components being filtered to a greater extent than relatively higher spatial frequency components; said method comprising the steps of:
   receiving an image data signal;
   subtracting a delayed recursive signal from said image data signal to obtain a difference signal;
   applying said difference signal to a control filter having a high-pass characteristic which is modified in accordance with the spatial frequency content of the difference signal, to thereby derive a noise filtered difference signal;
   adding the filtered difference signal to the delayed recursive signal so as to derive a sum signal, said sum signal being a noise filtered version of the image data signal; and
   delaying the sum signal to obtain said delayed recursive signal.

2. A method as claimed in claim 1, wherein the filtering of said difference signal depends on spatial frequencies thereof in given horizontal and/or vertical directions, and said filtering is in a spatio-temporal direction different from the directions of said spatial frequencies.

3. A method as claimed in claim 2, wherein the filtering is in the temporal direction and depends on horizontal and vertical spatial frequencies.

4. A method as claimed in claim 2, wherein the filtering is in the vertical direction and depends on horizontal spatial frequencies.

5. A method as claimed in claim 1, wherein the filtering of said difference signal is reduced for all spectral content thereof in order to prevent the effect of the filtering from becoming large compared to the amplitude of a noise component of the difference signal.

6. A device for providing recursive noise filtering of an image data signal based on a local spatial spectral content of the image, relatively low spatial frequency components being filtered to a greater extent than relatively higher spatial frequency components; said device comprising:
   means for receiving an image data signal;
   means for subtracting a delayed recursive signal from said image data signal to obtain a difference signal;
   means for applying said difference signal to a control filter having a high-pass characteristic which is modified in accordance with the spatial frequency content of the difference signal, to thereby derive a noise filtered difference signal;
   means for adding the filtered difference signal to the delayed recursive signal so as to obtain a sum signal, said sum signal being a noise filtered version of the image data signal; and
   means for delaying the sum signal to obtain said delayed recursive signal.

7. A device as claimed in claim 6, wherein said control filter comprises:
   means for obtaining high-frequency components from said difference signal;
   means for obtaining an absolute difference between said difference signal and said high-frequency components;
   means for combining said high-frequency components and said differences signal in dependence upon said absolute difference, to thereby obtain a control signal; and
   means for combining said control signal and said delayed signal to obtain a noise filtered output signal.

8. A device as claimed in claim 6, comprising a plurality of parallel filtering branches for filtering in a plurality of first spatial directions in dependence upon spatial frequencies in respective second spatial directions different from said first spatial directions.

9. A device as claimed in claim 8, wherein outputs of the parallel filtering branches are weighted in accordance with respective filtering strengths of the parallel branches.

10. A display apparatus comprising a display device and an image data noise filtering device for noise filtering in accordance with a local spatial frequency content of the image, relatively low spatial frequency components being filtered to a greater extent than relatively higher spatial frequency components, the filtering device being in a video signal processing path connected to the display device; said filtering device comprising:

means for receiving an image data signal;

means for subtracting a delayed recursive signal from said image data signal to obtain a difference signal;

means for applying said difference signal to a control filter having a high-pass characteristic which is modified in accordance with the spatial frequency content of the difference signal, to thereby derive a noise filtered difference signal;

means for adding the filtered difference signal to the delayed recursive signal so as to obtain a sum signal, said sum signal being a noise filtered version of the image data signal; and means for delaying the sum signal to obtain said delayed recursive signal.

* * * * *